June 23, 1925.  
C. S. SHARP  
TANDEM DISK HARROW  
Filed Nov. 22, 1918

Inventor  
Charles S. Sharp  
by Chas. E. Lord  
Atty.

June 23, 1925.  
C. S. SHARP  
TANDEM DISK HARROW  
Filed Nov. 22, 1918
1,543,622
2 Sheets-Sheet 2
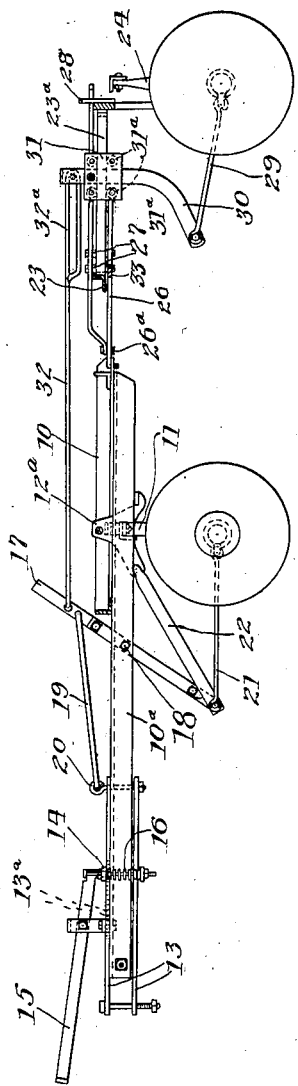
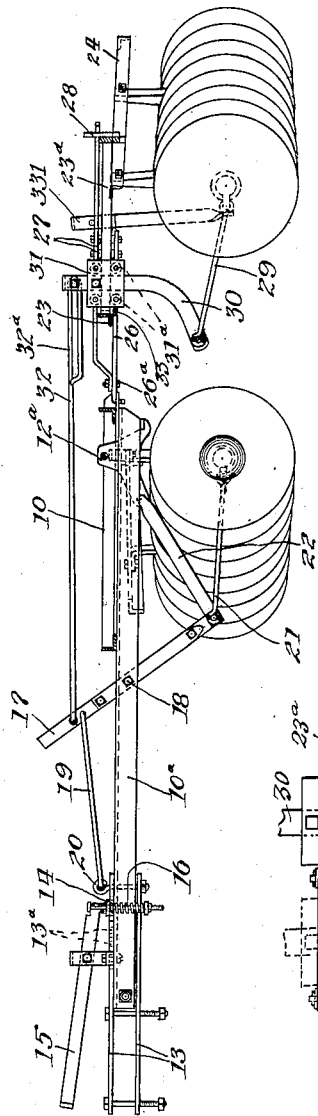
Inventor,  
Charles S. Sharp Patented June 23, 1925.

1,543,622

UNITED STATES PATENT OFFICE.

CHARLES S. SHARP, OF AUBURN, NEW YORK, ASSIGNOR TO INTERNATIONAL HARVESTER COMPANY, A CORPORATION OF NEW JERSEY.

TANDEM DISK HARROW.

Application filed November 22, 1918. Serial No. 263,715.

*To all whom it may concern:*

Be it known that I, CHARLES S. SHARP, a citizen of the United States, residing at Auburn, in the county of Cayuga and State of New York, have invented certain new and useful Improvements in Tandem Disk Harrows, of which the following is a full, clear, and exact specification.

This invention relates to disk harrows.

It is an object of this invention to provide a double disk harrow with means for straightening all gangs as the harrow is backed.

This type of harrow prior to this invention had gangs which were angled by hand either by means of a single lever operating all gangs or by means of a lever on each section of the harrow. This usually required that the tractor operator had to get off his tractor and angle or straighten the gangs by hand. It often happened that the disks were deep in the soil and that the operation required the exertion of considerable strength.

This invention replaces the old harrow with one in which all the operations of angling and straightening the gangs can be controlled from the tractor seat and while the harrow is being backed or pulled ahead.

Another object of this invention is to positively force the gangs of the rear sections to straighten in backing the harrow under all conditions and to positively straighten the front gangs at the same time if the operator desires.

Another object of this invention is to provide a double disk harrow with means whereby the gangs may be positively angled as the harrow is pulled ahead.

Another object is to provide means for controlling the angle of both front and rear gangs at the same time and to place this controlling means within reach of the tractor operator.

These and other objects which will be apparent are accomplished by my invention which comprises a double disk harrow having front and rear sections and gangs on both sections, means whereby said gangs may be automatically straightened by backing the tractor and harrow and means operable by the operator for controlling angling of the gangs from a tractor.

Referring now to the drawings,—

Fig. 2 is a partial section at the left of the center having the gangs straightened;

Fig. 3 is the same with the gangs angled; and

Fig. 4 is a detail of the rear guide block mounting.

Figure 1:
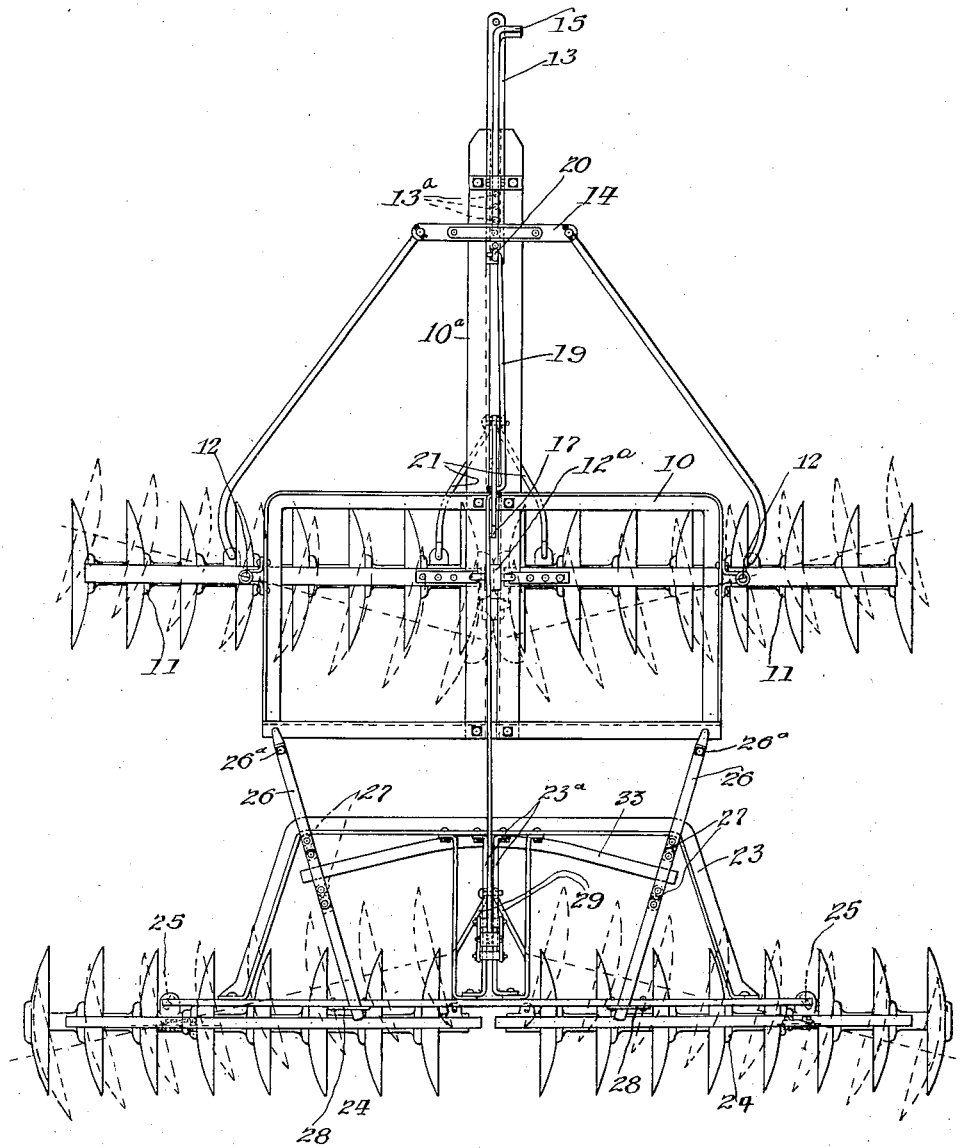
Figure 1 is a plan view of a harrow having my invention.

This harrow embodying my invention consists primarily of two sections, a front section and a rear section, the front section having a frame 10 on which two disk gangs 11 are mounted at the vertical pivots 12 at a point which is preferably a little more than half the length of the disk gangs from their inner ends. The inner ends of the gangs are slidably supported on the tongue angles 10ª by means of a guide block 12ª.

A draft head comprising members 13 is slidably mounted on the tongue angles 10ª and arranged to slide under a plate 14. A foot lever 15 has a finger passing through the plate 14 and engaging notches 13ª in the upper draft member 13 and springs 16 are mounted beneath plate 14 on each side of the tongue on pins secured to the ends of a cross piece 16ª which engages the end of lever 15 and holds the foot lever down in engagement with the draft members 13.

A lever 17 is pivoted at 18 to the tongue angles 10ª. A rod 19 connects the upper end of this lever to an eye 20 on the draft members 13. Rods 21 and 22 connect the lower end of the lever 17 also with the inner bearings of the disk shaft and the guide block 12ª respectively.

It will be seen, therefore, that when the draft head is pushed back along the tongue angles the rods 21 and 22 will be drawn forward straightening the gangs, and that as these draft members are forced backward the gangs are straightened. In order to effect movement of the draft members in either direction, in Figs. 2 and 3 the foot lever must be released at the same time the tractor pushes or pulls on the draft members 13.

The rear section consists of a frame 23 having disk gangs 24 pivotally mounted thereon at 25. Connection is made between the rear section and the front section by means of two rearwardly converging telescoping draft members 26 which are hingedly connected at their forward ends to the front section and which have two bars surrounding the forward extension of the frame 23 of the rear section. These bars are bolted at their forward ends at 26ª and are connected at the rear of the lower bar by spaced blocks 27, the forward one of which normally lie in the forward corners of the rear frame 23. The upper bar extends over the rear of the frame and through the loops 28. This permits the sections to approach each other in backing and the inner ends to converge on turning a corner.

The inner ends of the rear disk gangs 24 are connected to bar 30 by links 29 which are hingedly attached to the bar 30 which is carried by a block 31 which slides on the rear frame members 23ª. Rollers 31ª are supplied to decrease the friction of the block. This block is connected to the lever 17 by the angling rods 32 and a loop 32ª at the rear of this rod permits it to telescope somewhat when the two harrow sections are brought nearer together as in backing or turning. Nearly all the pull comes on the outer draft member in turning.

An equalizing bar 33 connects the draft members 26 and has its ends loosely held between the blocks 27 on each member as shown in Fig. 1.

This bar 33 is slidably secured to the frame by a bolt 33ª which is slidable between the guides 23ª as shown in Fig. 4 and this bar normally bears against the sliding block 31.

As the sections approach each other the draft members 26 and loop 32ª telescope on the rear section and the equalizing bar 33 loosely carried by members 26 will be forced back and it in turn will force back the block 31 thereby straightening the rear gangs. In turning, only that draft member 26 which lies on the inside of the turn will be forced back and consequently the center of the equalizing bar 33, the block 31 and the rear gangs can be forced back only about one-half as much as is the case when the harrow is backed. This, however, is sufficient to insure an easy turn of the gear gangs.

In operation, the disk gangs are positively swung on their pivots and are entirely controlled by movement of the tractor connected to draft head 13. If, for instance, the gangs are in non-working or straightened position as shown in Fig. 2, driving the tractor forward and releasing the draft head will swing the upper end of lever 17 forwardly, positively swing the inner ends of the front gangs rearwardly; and positively pull the inner ends of the rear gangs forwardly until the working position of Fig. 3 is assumed. If then, the tractor is backed without releasing the draft head, the front section of the harrow will first move toward the rear section, the front gangs remaining at angle, as the front section backs, the draft members 26 will telescope on the rear section and as bar 33 is carried with them it will engage block 31 and the rear gangs will be positively forced into straightened position and remain so as long as the harrow as a whole is being backed, re-assuming their angle when the forward drive is resumed and the harrow sections fall back to normal position. If, however, the draft head is released as backing begins, the front gangs will be positively straightened first through the sliding back of the draft head on the frame, the rear gangs remaining in angle by reason of the lost motion connection at slot 32ª. If the backing is continued, the rear gangs will straighten also, as just described, and the gangs will remain in straightened position until the draft head is again released and forward travel resumed. It is therefore possible, by backing the tractor, to effect any of three results, viz, straighten the rear gangs only, the front gangs only, or all the gangs, as may be necessary when the harrow has become bogged, and when forward travel is resumed the gangs can again fall into working angle.

While I have shown and described but a single embodiment of my invention, it is to be understood that it is capable of many modifications. Changes therefore in the construction and arrangement of parts may be made which do not depart from the spirit and scope of my invention as disclosed in the appended claims.

I claim:—

1. In a double harrow, front and rear pairs of angularly adjustable disk gangs, means including a member movable by draft power by which said gangs may be positively straightened when the harrow is backed, and means controllable from a point outside the harrow for positively angling the gangs by a pull on the draft member.

2. In a double harrow, front and rear pairs of angularly adjustable disk gangs, draft actuated means by which said gangs may be positively straightened when the harrow is backed, and positively angled when the harrow is pulled forward and a control device for said draft angling means.

3. In a double harrow, front and rear frames each having a plurality of disk gangs, draft actuated means by which said gangs may be positively straightened by backing and positively angled by pulling forward, and means, including a forwardly extending trip element, for locking the gangs at different adjustments.

4. In a double harrow, front and rear frames each having a plurality of disk gangs, draft actuated means by which said gangs may be positively straightened by backing and positively angled by pulling forward and control mechanism for said draft actuated means including means whereby the gangs may be held in straight position during all movements of the harrow.

5. In a double harrow, front and rear frames each having a plurality of disk gangs, draft actuated mechanism for positively angling and straightening all the gangs at once, and means independent of said draft actuated means, for positively forcing the rear gangs to straighten when the harrow is backed with the gangs in angled position.

6. In a harrow, front and rear sections, implement gangs pivoted on each section, gang angling means associated therewith including a control element operable from a distance, and means independent of the draft angling means for positively forcing the rear gangs to straighten on backing the harrow.

7. In a harrow, front and rear sections, disk gangs on each section, means for angling said gangs, and means independent of said angling means for positively straightening the rear gangs in backing so that said harrow may be backed indefinitely.

8. In a harrow, front and rear sections, disk gangs on each section, draft actuated means for angling said gangs, means independent of said angling means for positively straightening the rear gangs in backing so that said harrow may be backed indefinitely, and means including a forwardly extending trip element, for controlling the operation of said draft angling means.

9. In a harrow, front and rear sections, disk gangs pivoted on each section, a draft head longitudinally slidable on the front section, a lever pivoted between its ends on the front section to swing in a longitudinally extending vertical plane, a link connecting said draft head and the upper end of said lever, links connecting the lower end of the lever with the front gangs and the upper end of the lever with the rear gangs, whereby forward movement of the draft head acts positively on the gangs to swing them into angle.

10. A tandem disk harrow having a front pair of gangs, a rear pair of gangs, draft mechanism to which the gangs are connected so that they may be set at various angles to the line of draft, and means associated with the draft mechanism and connected with the gangs movable to various positions to set the angle of the gangs relative to the line of draft, said means being adapted to be connected to a tractor or the like so that, when it is pulled forward by a tractor, it is set to a position for a working angle for the gangs, and, when pushed backward by a tractor or the like, it is set to a position for transport angle of the gangs.

11. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, and a clevis to which the forward end of the draw rod is connected for imparting either a pull or a thrust to the draw rod, substantially as described.

12. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, a clevis to which the forward end of the draw rod is connected for imparting either a pull or thrust to the draw rod, and latch means for holding the parts in adjusted relation, substantially as described.

13. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, a clevis to which the forward end of the draw rod is connected for imparting either a pull or thrust to the draw rod, and latch means connected to the lever for holding the parts in adjusted relation, substantially as described.

14. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, a clevis to which the forward end of the draw rod is connected for imparting either a pull or thrust to the draw bar, and latch means for holding the parts in adjusted relation, said latch means including a hand lever adapted to release the latch and permit the adjustment of the gangs to be effected by the pull of the draft, substantially as described.

15. In a disk harrow, the combination of a frame, a pair of disk gangs movably secured to the frame, a draw bar for each of the disk gangs, a lever pivoted with respect to the frame and to one end of which the draw bars are connected, a draw rod connected to the other end of the lever, a clevis to which the forward end of the draw bar is connected for imparting either a pull or thrust to the draw rod, and latch means connected to the lever for holding the parts in adjusted relation, said latch means including a hand lever adapted to release the latch and permit the adjustment of the gangs to be effected by the pull of the draft, substantially as described.

In testimony whereof I affix my signature.

CHARLES S. SHARP.